US005700599A

United States Patent [19]
Danko et al.

[11] Patent Number: 5,700,599
[45] Date of Patent: Dec. 23, 1997

[54] HIGH ABSORPTION RATE BATTERY SEPARATOR

[76] Inventors: Thomas Danko, 3013 Edgewood Pkwy., Woodridge, Ill. 60517; Myron Donald Nicholson, 13102 S. Red Dr., Lemont, Ill. 60439

[21] Appl. No.: 585,554

[22] Filed: Jan. 12, 1996

[51] Int. Cl.$^6$ .................................................. H01M 2/18
[52] U.S. Cl. ........................ 429/249; 429/247; 429/251; 429/254
[58] Field of Search .............................. 429/247, 249, 429/251, 254

[56] References Cited

U.S. PATENT DOCUMENTS

| 373,064 | 11/1887 | Gassner, Jr. |
|---|---|---|
| 1,408,140 | 2/1922 | Schulte |
| 1,607,460 | 11/1926 | Jones |
| 2,272,969 | 2/1942 | French |
| 2,317,711 | 4/1943 | Andre |
| 2,403,571 | 7/1946 | Wilke |
| 2,534,336 | 12/1950 | Cahoon |
| 2,700,694 | 1/1955 | Fernald |
| 2,785,106 | 3/1957 | Mendelsohn |
| 2,858,353 | 10/1958 | Mendelsohn |
| 2,900,433 | 8/1959 | Cahoon et al. |
| 2,904,615 | 4/1959 | Hatfield |
| 2,930,829 | 3/1960 | Jacquier |
| 2,994,728 | 8/1961 | Herold |
| 3,013,099 | 12/1961 | Mendelsohn |
| 3,022,367 | 2/1962 | Horowitz et al. |
| 3,042,734 | 7/1962 | Carmichael et al. |
| 3,055,966 | 9/1962 | Sundberg |
| 3,068,312 | 12/1962 | Daley et al. |

(List continued on next page.)

FOREIGN PATENT DOCUMENTS 721815  11/1965  Canada.

OTHER PUBLICATIONS

Kirk–Othmer, Encyclopedia of Chemical Technology, 3rd Ed., vol. 3, pp. 621, 622, 625 and 626 (John Wiley & Sons, Inc., 1978) no month available.
"News Release" for Sepra–Cel Battery Separator, 1 page brochure (Viskase, Corp., 1994).
"Sepracel Product Data", 1 page brochure (Viskase Corp., 1994) no month available.
"Cel–Kote Process Product Data" 1 page brochure (Viskase Corp., 1994) no month available.
"Technology Update High Alpha Cellulose . . . " 1 page brochure (Viskase Corp., 1994) no month available.
"Dimensional Stability in a Range of Films," 1 page brochure (Viskase Corp., 1994) no month available.
L. B. Adams et al, "Functional Aspects of Separators for Silver–Zinc Alkaline Storage Batteries," pp. 141–162, Power Sources +; Proceedings of the 8th Inter. Symp., 1972 no month available.
R. E. Post, "The Nature of Celllose as Related to Its Application as a Zinc–Silver Oxide Battery Separator", 263–269, Zinc–Silver Oxide Batteries, Pap. Symp. 1968 meeting (1971, Lewis Res. Cent., NASA, Cleveland, OH) no month available.
S. Megahed, "Rechargeable Nonaqueous Batteries,", *The Electrochemical Society Interface*, pp. 34–37, Winter, 1995.

(List continued on next page.)

Primary Examiner—Prince Willis, Jr.
Assistant Examiner—Carol Chaney
Attorney, Agent, or Firm—Cedrick M. Richeson

[57] ABSTRACT

A battery separator of a cellulosic nonwoven substrate coated on at least one surface with a cellulose film and process for making such separator by contacting a nonwoven cellulosic textile substrate with a cellulose or cellulose derivative solution on at least one side of said substrate; converting the solution to a solid cellulose or cellulose derivative having a degree of polymerization of at least 500, preferably at least 600, to form a coated substrate; washing and drying the coated substrate to provide a battery separator having a absorption rate of at least 6 mm/5 min. and a 30% KOH absorption of at least 200 g/m$^2$.

22 Claims, 1 Drawing Sheet

U.S. PATENT DOCUMENTS

| | | |
|---|---|---|
| 3,068,313 | 12/1962 | Daley . |
| 3,069,489 | 12/1962 | Carmichael et al. . |
| 3,081,372 | 3/1963 | Soltis . |
| 3,089,914 | 5/1963 | Carmichael et al. . |
| 3,097,975 | 7/1963 | Horn et al. . |
| 3,121,658 | 2/1964 | Orsino et al. . |
| 3,186,876 | 6/1965 | Piechon . |
| 3,186,877 | 6/1965 | Stanimirovitch . |
| 3,218,197 | 11/1965 | Carmichael et al. . |
| 3,269,869 | 8/1966 | Mendelsohn . |
| 3,505,185 | 4/1970 | Hausler . |
| 3,980,497 | 9/1976 | Gillman et al. ............ 429/145 |
| 4,091,185 | 5/1978 | Chireau et al. ............ 429/144 |
| 4,124,743 | 11/1978 | Chireau et al. ............ 429/144 |
| 4,137,379 | 1/1979 | Schmidt et al. ............ 429/254 |
| 4,356,046 | 10/1982 | Yamazaki et al. ............ 156/86 |
| 4,551,402 | 11/1985 | Tamura et al. ............ 429/254 |
| 4,699,858 | 10/1987 | Nakao et al. ............ 429/254 |
| 4,794,057 | 12/1988 | Griffin ............ 429/94 |
| 4,902,590 | 2/1990 | Adamson ............ 429/94 |
| 5,026,617 | 6/1991 | Kosaka et al. ............ 429/206 |
| 5,401,594 | 3/1995 | Schwobel et al. ............ 429/142 |
| 5,419,962 | 5/1995 | Robertson et al. ............ 428/348 |
| 5,462,820 | 10/1995 | Tanaka ............ 429/174 |
| 5,470,519 | 11/1995 | Markulin ............ 264/193 |

OTHER PUBLICATIONS

P. Bro, "Primary Batteries," *The Electrochemical Society Interface*, pp. 42–45, Winter 1995.

P. D. Bennet et al, "Aqueous Rechargeable Batteries," *The Electrochemical Society Interface*, pp. 26–30, Winter 1995.

S. C. Levy et al, "Batteries Portable Power for the Future," *The Electrochemical Society Interface*, pp. 25, 32, 33, Winter, 1995.

J. E. Cooper et al (Ed.), *Characteristics of Separators for Alkaline Silver Oxide, Zinc Secondary Batteries Screening Methods*, pp. 1–153, Sep., 1965, (Wright–Patterson Air Force Base Ohio, 1965).

T. J. Hennigan, "Separator Materials for Silver Oxide Zinc and Silver Oxide Cadmium Electro–Chemical Cells," *Proceedings of Advances in Battery Technology Symposium*, Dec. 4, 1965, vol. 1, pp. 145–194 (The Electrochemical Society, Inc.).

G. A. Dalin, "Increase in the Life of Silver–Zinc Batteries," *Proceedings of Advances in Battery Technology Symposium*, Dec. 1, 1967, vol. 3, pp. 31–48 (The Electrochemical Society, Inc.).

*Proceedings of the Symposium on Battery Separators*, Feb. 18–19, 1970, pp. 1–396 (The Columbus Section of the Electrochemical Society, Columbus, Ohio).

*Proceedings of Advances in Battery Technology Symposium*, Dec. 6, 1968, pp. 37–90 and 115–140 (The Electrochemical Society, Inc.).

Stanley E. Ross, "Nonwovens: An Overview" *Chemtech*, pp. 535–539, (Sep., 1972).

A. Fleisher (Ed.), *Zinc–Silver Oxide Batteries*, pp. 219–309, Fall Meeting of the ACS, Monreal Canada, 1968.

Harald Hoffman, "Manufacture and Use of Nonwoven Separators," *Batteries International*, pp. 44,45 and 48 (Oct., 1995).

V.D'Agostino et al, "Low Temperature Alkaline Battery Separators," pp. 87–91, Power Sources Symp., 27th, Secondary Batteries Session, Jun. 21–24, 1976, Atlantic City, N.J.

Thomas Danko, "Strength Properties of Separators in Alkaline Solutions", The Eleventh Annual Battery Conference on Applications and Advances, pp. 283–286 (Jan. 9–12, 1996), (Institute of Electrical and Electronics Engineers, Inc., 1996).

Thomas Danko, "Properties of Cellulose Separators for Alkaline Secondary Batteries," Proceedings of the Tenth Annual Battery Conference on Applications and Advances, pp. 261–264 (Institute of Electrical and Electronics Engineers, Inc., Jan. 10–13, 1995).

Albert Himy, *Silver–Zinc Battery Phenomena and Design Principles*, 1st Ed., pp. 7–9, 15–18, 20 21, 31–33, 49–54 and 67–75 (Vantage Press, 1986) (no month available).

Ed., R. E. Kirk and D. F. Othmer, *Encyclopedia of Chemical Technology*, 1st Ed., vol. 2, pp. 324–360 (Interscience Encyclopedia, Inc., 1948) (no month available).

HIGH ABSORPTION RATE BATTERY SEPARATOR

BACKGROUND OF THE INVENTION

The present invention relates to battery separators and electric batteries. The term "battery" as pertaining to electric batteries is used herein to denote one or more electric cells connected together to convert chemical energy into electrical energy. Batteries are used to power a variety of devices including radios, toys, heating aids and portable equipment. An "electric cell" is a device for converting chemical energy into electric energy. Dry cell batteries have an electrolyte made nonspillable by use of an absorbent material. Dry cell batteries are also known as "LeClanche" cells after George LeClanche who received a French patent in 1866 for an electric cell having a zinc electrode and a $MnO_2$ coated carbon electrode in a nonspitiable (hence the term "dry") electrolyte of ammonium chloride paste. By the 1960s other electrode systems including: Ag/Zn; HgO/Zn; and alkaline $MnO_2$/Zn cells were in use. Recently manufacture of mercury-containing batteries have declined due to environmental disposal concerns.

All batteries have at least one anode and one cathode separated by electrolyte. "Battery separators" are physical barriers interposed between the anode and the cathode which prevent physical contact therebetween. Battery separators must be permeable to electrons and/or ions.

A variety of materials have been used as battery separators. Various dry cell and storage batteries have employed wheat flour and cornstarch paste, paper, wood veneer, hard rubber, porous rubber, celluloid, glass mats, regenerated cellulose and fiber-reinforced regenerated cellulose (sausage casings). A variety of materials have been used or explored for use as battery separators including polyvinyl alcohol, methyl cellulose, polypropylene, fiberglass, and crosslinked methacrylic acid grafted polyethylene. These separators are used to separate the positive and negative electrodes of a cell to prevent short circuits. Separators should distribute and retain electrolyte between the electrodes while preventing dendritic growths or soluble products from shorting the cell or migrating to an opposing electrode. Desirably, separators will: be stable in the cell environment resisting degradation by cell media; permit conduction across the separator of current transferring ions or charges; be capable of operation under conditions of use including desired operating temperatures, pressures, and forces; and be easily and economically fabricated into electric cells.

Battery separators have been used almost from the beginning of electric cell and battery development. Alexander Volta used a felted cloth saturated with a sodium chloride solution. Plante in 1859 used strips of rubber to space plates in a secondary cell. Glass rods, and perforated or slotted rubber was also used. Thin wood separators were used in lead acid batteries until at least the 1940s, when they were displaced by vulcanized rubber, plastic and impregnated paper separators. Other separators have included microporous latex rubber, microporous poly(vinylchloride) and woven fabrics of cotton or nylon. Impregnated paper separators were widely used in automotive batteries in the U.S. until at least the late 1960s. They were manufactured by stiffening α-cellulose with a thermosetting binder to make it resistant to $H_2SO_4$, and using paper forming equipment. Sealed cell batteries often use separators which absorb all available electrolyte. Generally these absorbent separators are nonwoven. The earliest absorbent separators were cellulosic and later, resin bonded paper and polyamide based nonwovens were also used. Sterilizable nonwoven fabrics of polypropylene have also been used. Ag/Zn batteries have used cellulose fiber reinforced casing type separators since the 1960s. Regenerated cellulose film (cellophane) which does not have fiber reinforcement has also been used as a battery separator e.g. for Ag/Zn batteries. Disadvantageously, it suffers from a low electrolyte absorption rate. Noncellulosic nonwovens have also been laminated to cellulose films using adhesives to produce separators having high electrolyte absorbance and a fast absorption rate. Disadvantageously, laminate adhesives may interfere with electrolyte permeability across the separator and transfer of electrons and/or ions may be hindered causing increased resistance and lower voltage. Also, laminates using adhesives including laminates held together with low amounts of adhesive or adhesives chosen to minimize resistance and transfer hindrance are subject to delamination which leads to shorting and early battery failure.

SUMMARY OF THE INVENTION

The present invention is a battery separator of a nonwoven cellulosic substrate coated on at least one surface with a cellulose film and a process for making such separator by contacting a nonwoven cellulosic textile substrate with a cellulose or cellulose derivative solution on at least one side of said substrate; converting the solution to a solid cellulose or cellulose derivative film, preferably having a degree of polymerization of at least 500, more preferably at least 600, to form a coated substrate; washing and drying the coated substrate to provide a battery separator having a absorption rate of at least 6 mm/5 min. and a 30% KOH absorption of at least 200 $g/m^2$, and preferably at least 300 $g/m^2$. The inventive separators are delamination resistant, while having a fast absorptive rate and high level of electrolyte absorptive capacity.

DETAILED DESCRIPTION OF THE INVENTION

Figure 1:
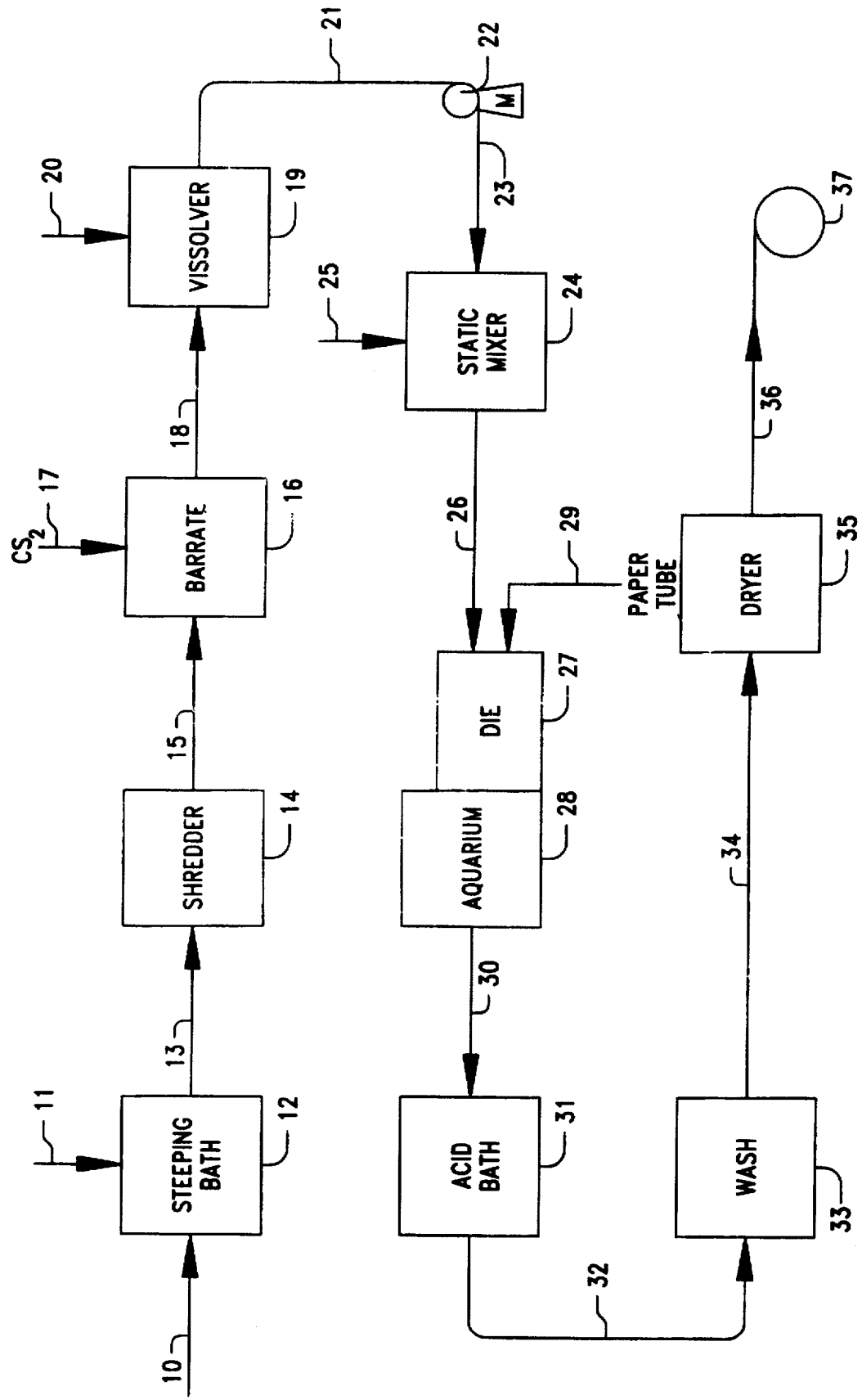
FIG. 1 is a schematic representation of a process for making an article according to the present invention.

Battery separators provide mechanical spacing between electrodes to prevent shorting. Other desirable and necessary characteristics of good battery separators include: physical strength to hold up in use and facilitate ease of battery manufacture; a high dielectric constant to prevent shorting; a minimum electrolytic resistance to provide high current flow; physical and chemical stability in the cell environment; and prevention of solids transfer from electrode to electrode which could cause shorting. Beneficially, separators also have the following additional characteristics: flexibility to facilitate battery manufacture; rapid wetting and rewetting to facilitate high speed manufacture and rechargability of batteries after use; gas permeability to reduce intracell pressure build up; effective control of migration of certain metal species to prevent premature battery failure; and low cost.

Prior art battery separators have a variety of disadvantages. Laminates in which noncellulosic adhesives are used either have undesirably high resistance or are subject to delamination, shorting and early battery failure. Many separators are not sufficiently flexible or thin or uniform for use in mass production of batteries, especially dry cell batteries. Also degradation resistance, electrolyte absorptive capacity, absorptive rate, resistance to dendritic growths and shorting are all important parameters for battery separators used in high speed manufacturing processes. Paper separators alone are subject to fast degradation by alkaline electrolytes causing shorting and failure. Regenerated cellulose films (cellophane) separators have low absorption rates making them unsuitable for high speed production of some batteries in which the separator must quickly become saturated with electrolyte prior to completion of the battery enclosure. The battery separator art has seen little improvement in prior art cellulosic fiber-reinforced cellulosic battery separators over the past several decades.

According to the present invention a battery separator is provided having a nonwoven cellulosic substrate coated on at least one surface with a cellulose film wherein the separator has a absorption rate of at least 6 mm/5 min. and a 30% KOH solution absorption of at least 200 g/m$^2$. The inventive battery separator is delamination resistant, resists dendritic growth and shorting while providing low electrolytic resistance, high electrolyte capacity and a fast absorptive rate. Fundamental to the present invention is the concept of limiting the extent of penetration of the cellulose or cellulose derivative into the nonwoven substrate in order to enhance absorptive rate and capacity while maintaining a strong substrate-coating bond without delamination and without requiring use of resistance raising adhesives.

The present invention is particularly useful with respect to the manufacture and use of electric batteries including dry cells. The inventive battery separators have fast absorptive rates and a high level of electrolyte absorptive capacity while being resistant to delamination. The improved properties of the inventive separator are well suited to use in alkaline dry cells. Typical alkaline dry cell batteries use electrolytes comprising 20–50 weight % potassium hydroxide (KOH) in aqueous solution. It is believed that absorptive properties of electrolytes such as aqueous KOH are linear with respect to basic strength of electrolytic solutions. In the present invention electrolyte absorptive properties are reported with respect to a 30 weight % aqueous solution of KOH. However these are just tests to determine the absorptive property improvements. Separators having the presently claimed absorptive property values should exhibit similarly improved values when used with electrolytes having various strengths and compositions, and the claimed separators are not limited to use with electrolyte solutions of 30% KOH only.

The cellulosic film component of the battery separator may be made by a variety of procedures. For example, cellulose with or without chemical modifications, may be put into solution with a solvent, e.g. by dispersion or by dissolution, and then coated onto a cellulosic nonwoven followed by solvent removal (with or without chemical modification of the cellulose) to solidify the formed cellulosic article. Examples of known processes for production of cellulosic articles are the viscose, cuprammonium, N-methyl-morpholine-n-oxide, zinc chloride, cellulose acetate (with or without subsequent deacetylation), and cellulose carbamate processes as described in U.S. Pat. Nos. 1,601,686; 2,651,582; 4,145,532; 4,426,228; 4,781,931; 4,789,006; 4,867,204; 4,999,149; and 5,277,857, the teachings of which are all hereby incorporated by reference. Examples of the suitable cellulosic coatings include: regenerated cellulose; derivatized cellulose, deacetylated cellulose acetate, and cellulose. Preferably, the cellulose coating employed a degree of polymerization between 350 to 800 units. The formed battery separator may be a flat sheet or tube. It is contemplated that the present invention may utilize any known method of producing a cellulosic film.

The cellulose coating can have additives for processing, or for improved properties including e.g. surfactants, and olefinic oxide polymers such as poly(ethylene oxide). Poly (ethylene oxide) may be added to a solution of cellulose or a cellulose derivative such as viscose in amounts up to about 20% by weight based on the weight of the cellulose, preferably from 1 to 10% by weight. Such poly(ethylene oxide) is believed to provide or facilitate plasticization without requiring addition of glycerin which is deleterious to battery separator performance.

The invention also uses a nonwoven substrate. The term "nonwoven" as used herein refers to nonwoven papers, fabrics, or textiles and includes dry laid webs, and wet laid webs.

Nonwovens are made from natural or synthetic fibers bound together in a web. Natural fibers include cellulosic fibers such as cotton, hemp, jute, and wood pulp. Synthetic fibers include: cellulosic fibers such as regenerated cellulose, rayon, lyocell, cellulose acetate, cellulose carbamate, and deacetylated cellulose acetate. These fibers, either alone or in blends, are formed into a web using binding means such as hydrogen bonds, viscose, regenerated cellulose, other cellulose or cellulose derivative solutions which are then solidified, resins, solvated cellulose, sizing agents which also have bonding characteristics, and alkyl ketene dimers either alone or in blends. Typically, such binding means are present in an amount from 0–5 weight %. Preferred nonwovens are paper webs such as hemp paper bonded with hydrogen bonds, cellulose or food grade binders. Suitable nonwoven cellulose paper webs include abaca hemp casing papers available from C. H. Dexter Corp. of Windsor Locks, Conn. In one embodiment of the invention, the nonwoven substrate consists essentially of at least 95% fibers, especially natural cellulose fibers, synthetic cellulose fibers, or blends thereof.

"Paper" as used herein means a nonwoven planar or sheet material comprising at least 95% fibrous material and 5% or less of additives including e.g. binding agents or sizing agents as noted above.

Advantageously, the present invention will coat a cellulosic nonwoven with a cellulosic film to produce a battery separator having at least about 20% by weight of cellulose or a cellulose derivative based on the bone dry gauge (BDG) weight of the nonwoven added to the cellulosic nonwoven. The term "bone dry gauge" as used herein refers to cellulose such as regenerated cellulose and/or cellulosic nonwovens such as paper including any noncellulosic additives which have been dried by heating in a convection oven at 160° C. for one hour to remove water moisture. Suitable cellulosic add-on levels are between about 20 to 500% BDG. Preferably the coating add-on will be at least 100% BDG, and more preferably between about 150–300% based upon the bone dry gauge weight of the nonwoven substrate.

With further respect to the present invention, the separator will generally have a thickness of 10 mils (254 microns) or less. Both planar, cylindrical and tubular articles are contemplated with a tubular manufacturing process being preferred in order to facilitate bidirectional orientation by stretching to improve strength, dimensional stability and uniformity.

A starting material in the manufacture of the present invention is high quality, relatively pure cellulose pulp (either cotton or wood), most typically in sheet form. Advantageously, suitable pulp may have an $\alpha$-cellulose content of at least 90 wt. %, preferably at least 95 wt. % and most preferably 98 wt. %. Higher $\alpha$-cellulose contents are believed to yield higher strength properties. In the manufacture of fibrous battery separators of the present invention, regenerated cellulose is generally made using the well known viscose process whereby viscose is typically extruded through an annular die and is coated on one or more sides of a tube which is generally formed by folding a web of paper so that the opposing side edges overlap. The viscose impregnates the paper tube where the viscose is subsequently coagulated and regenerated by passing into a coagulating and regenerating bath to produce a tube of regenerated cellulose. This tube is subsequently washed, and dried e.g. by inflation under substantial air pressure (which may also impart transverse direction orientation). A suitable viscose process is described below which utilizes cellulosic sheet starting materials having a suitable density between about 0.8–0.9 gm/cc.

This relatively pure cellulose is converted to alkali cellulose by steeping in a sodium hydroxide solution. Cellulose absorbs the sodium hydroxide and the fibers swell and open. The degree of steeping is preferably held to the minimum amount necessary to ensure uniform distribution of the sodium hydroxide on the cellulose. A steeping bath temperature of about 19°–30° C. is preferred, and a suitable sodium hydroxide concentration in the sleeping bath is about 17–20 wt. %.

In a typical steeping apparatus there is no forced circulation of caustic between the cellulose sheets, so it is important that the rate of filling the apparatus with caustic (fill rate) be such that the caustic reaches every portion of the sheets. The cellulose sheets are typically held in place in the steeping chamber by a support frame, and a typical steep time in commercial practice is 50–60 minutes.

After steeping, the caustic is drained and excess absorbed sodium hydroxide solution is pressed out, typically by a hydraulic ram. A typical alkali cellulose composition is about 13–18% caustic, 30–35% cellulose and the remainder water (by wt.). The percent caustic and cellulose in the alkali cellulose is controlled by the well-known press weight ratio. This ratio is the weight of the wet cake after pressing divided by the weight of the original cellulose used. A typical press ratio is about 2.6–3.2. After the press out, the alkali cellulose is shredded, i.e. the fibers in the sheet am pulled apart so that during xanthation the carbon disulphide contacts all portions of the alkali cellulose. There is an optimum shredding time for each system which can only be determined by testing. Typical shredding time is about 40–90 minutes. Heat is generated during the shredding step and the temperature may, for example, be controlled by means of a cooling water jacket around the shredder, preferably in the range of 25°–35° C.

During a succeeding, preferred aging step, an oxidative process is initiated which breaks the cellulose molecular chains thereby reducing the average degree of polymerization which will in mm reduce the viscosity of the viscose to be produced. During the aging step the shredded alkali cellulose is preferably maintained in covered vessels to prevent drying.

The conversion of alkali cellulose to cellulose xanthate is accomplished by placing the shredded and aged alkali cellulose in a closed reactor known as a baratte and adding carbon disulphide which vaporizes and reacts with the alkali cellulose to form cellulose xanthate. The amount of carbon disulphide used to achieve the desired conversion to cellulose xanthate is typically equal in weight to about 26–38% of the bone dry weight cellulose in the alkali cellulose, and preferably only enough to produce cellulose xanthate with acceptable filtration characteristics.

The length of time required for the xanthation reaction (conversion of alkali cellulose to cellulose xanthate) depends on the reaction temperature and the quantity of the carbon disulphide. Variations in such parameters as the quantity of carbon disulphide used as well as the temperature, and pressure during xanthation is determined by the desired degree of xanthation. The percent total sulphur is directly related to the amount of carbon disulphide introduced, including xanthate and by-product sulphur. In general, xanthation reaction conditions are varied to ensure that adequate conversion is achieved by reaching a total sulphur content greater than about 1.1 wt. %. Typically, there is about 0.4–1.5% by wt. sulphur in the by-products admixed with cellulose xanthate.

The purpose of converting alkali cellulose to cellulose xanthate is to enable dissolution of the cellulose in a dilute solution of sodium hydroxide, e.g. 3.6–5.0 wt. %. This is the so-called viscose formation or "vissolving" step, in which sodium hydroxide is absorbed onto the cellulose xanthate molecule which becomes highly swollen and dissolves over a finite time period. This step is preferably accelerated by cooling and agitation. Sufficient cooling is preferably provided to maintain the mixture at about 10° C. or less. The quality of the solution is typically determined by measuring the filterability of the viscose e.g. by rate of clogging or throughput through a filter such as a cloth filter. The viscose is allowed to ripen and deaerate, is filtered under controlled temperature and vacuum. During ripening, reactions occur which result in a more uniform distribution of the xanthate group on the cellulose and a gradual decomposition of the xanthate molecule which progressively reduces its ability to remain dissolved, and increases the ease of viscose-cellulose regeneration.

Viscose is essentially a solution of cellulose xanthate in an aqueous solution of sodium hydroxide. Viscose is aged (by controlling time and temperature) to promote a more uniformed distribution of xanthate groups across the cellulose chains. This aging (also termed "ripening") is controlled to facilitate gelation or coagulation. If the desired product is a tube, the tubular form is obtained by forcing the viscose through a restricted opening, for example, an annular gap. The diameter and gap width of the opening, as well as the rate at which the viscose is pumped through, are designed in a manner well known to those skilled in the art for coating fiber-reinforced nonwovens such that a planar or tubular cellulose coated nonwoven of specific wall thickness and diameter is formed from the viscose.

The extruded viscose coated nonwoven is converted (coagulated and regenerated) to cellulose in the extrusion bath by action of a mixture of acid and salt, for example, sulphuric acid, sodium sulphate and ammonium striphate. A typical bath contains about 2–10% sulfuric acid by weight, and the bath temperature may be about 30°–56° C.

The cellulose coated nonwoven emerging from the acid/salt bath is preferably passed through several dilute acid baths. The purpose of these baths is to ensure completion of the regeneration. During regeneration, gases (such as H₂S and CS₂) are released through both the inner and outer surfaces of the coated nonwoven, and means must be provided for removing these gases from the casing. After the casing has been thoroughly regenerated and the salt removed, it is preferably passed through a series of heated water baths to wash out residual sulfur by-products and may also pass through a desulphttring mb containing a dilute (<10%) aqueous solution of chlorine bleach or caustic. The above process is similar to that for making fibrous sausage casing which has also been used commercially in the past for battery separators. Although glycerin is used in sausage casing to facilitate plasticization, it is omitted from production of battery separators. The present invention varies the degree of polymerization (DP) and/or process conditions to limit penetration of the cellulosic film into the nonwoven to improve absorption rates and electrolyte absorption capacity. Degree of polymerization (DP) as used herein means the number of anhydroglucose units in the cellulose chain. DP may be determined by methods known in the art such as ASTM D-1795-90. Suitable DP values of the cellulose or cellulose derivative film may be at least 500, with at least 600 preferred. Optionally, DP values of at least 700 may advantageously be employed. Battery separators are beneficially free of glycerin which interferes with battery performance.

The viscose is extruded onto preferably one, or optionally both sides of a tube which is usually formed by folding a web of paper so that the opposing side edges overlap. In production of fibrous food casings or prior art cellulosic battery separators the viscose impregnates the paper tube where it is coagulated and regenerated to produce a fiber-reinforced composite tube of regenerated cellulose. In the present invention this penetration is limited to enhance the absorption rate and total electrolyte (e.g. KOH) absorption. The nonwoven paper provides fiber reinforcement which is generally utilized to provide high tensile strength, fast absorption rate and high electrolyte absorption.

Cellulosic separators of the present invention are typically humidified to a level sufficient to allow the separators to be handled without undue breakage from brittleness. A non-glycerin humectant or plasticizer such as poly(ethylene oxide) which does not unduly interfere with battery function may be employed to regulate moisture and/or electrolyte retention and separator swelling to produce a battery separator which has sufficient flexibility, or only water may be used with water barrier packaging to ensure proper moisture levels prior to usage.

Cellulosic battery separators suitable for use in the present invention may have a moisture content of less than about 100 wt. % based upon the weight of bone dry gauge (BDG).

For the fibrous paper separator of the present invention a moisture content ranging from about 4 wt. % BDG to about 25 wt. % BDG is preferred. Higher moisture levels may inhibit or limit total KOH or electrolyte absorption and lower absorption rates.

In production of tubular cellulose battery separators during the cellulose regeneration step, as described above, sulfur-containing gases and water vapor accumulate inside the regenerating tube. These waste gases must be removed, and this is commonly done by slitting the battery separator walls at intervals during production so the waste gases may be vented.

Referring now to FIG. 1, cellulose starting material in the form of sheets of pulp 10 and an aqueous solution of sodium hydroxide 11 are brought into contact in a steeping bath 12 to convert the cellulose to alkali cellulose. As noted above, typically high quality cellulose pulp having a density between about 0.8–0.9 g/cm$^3$ is used with a 17–20 weight percent aqueous solution of sodium hydroxide. Cellulose is held in the steeping bath for about 50–60 minutes at a bath temperature of about 19°–30° C. The steeping bath is drained and the alkali cellulose pressed as described in further detail above. The pressed alkali cellulose is transferred to shredding means such as a temperature controlled mechanical shredder 14 where the alkali cellulose fibers are pulled apart. The shredded alkali cellulose is aged for a suitable time to produce the desired degree of polymerization and then transferred to a baratte 16 to which $CS_2$ is added to convert the alpha cellulose to cellulose xanthate. The cellulose xanthate 18 is then transferred to a vissolver 19 with addition of aqueous sodium hydroxide 20 and the temperature is controlled and mixture agitated to place the cellulose xanthate into solution thereby forming viscose. The formed viscose 21 is allowed to ripen to achieve the desired xanthation, deaerated, filtered and conveyed via pumping means such as a viscose pump 22 and transfer means such as pipe 23 to optional mixing means such as a static mixer 24. An olefinic oxide polymer 25 such as poly(ethylene oxide) may optionally be added as a metered solution to the static mixer 24 which contains a series of baffles to facilitate mixing of the olefinic oxide polymer 25 and viscose 21. The viscose 21 and optional poly(ethylene oxide) 25 are preferably uniformly mixed to produce a homogeneous solution which is transferred by transfer means 26 such as a pipe to an extrusion die or nozzle 27 which immediately opens into coagulation and regeneration means such as a tank hereinafter referred to as an aquarium 28 containing an acid such as sulfuric acid which initiates and causes coagulation and regeneration thereby forming a shaped article. The aquarium may also contain agents to modify the rate of regeneration, such as metal salts, such as those as is well known in the art of making sausage casings.

A cellulosic nonwoven fiber web of e.g. paper 29 is admitted to die 27 where the viscose is extruded onto the paper before it enters the aquarium. Abaca fiber cellulose casing papers having a basis weight of about 25 g/m$^2$ are suitable. Different dies are used for production of tubular and sheet articles and suitable dies are well known in the art. Tubular articles are fequently slit to form sheets and reeled. In the production of tubular, cellulose coated, nonwoven battery separators, the paper is shaped into a tube prior to coating with viscose. In the present invention, the cellulosic coating solution e.g. viscose is allowed to only slightly penetrate the paper prior to admittance to the aquarium and penetration time may be adjusted by modifying the distance between the die and aquarium and/or adjusting the travel speed of the article, and most importantly by selection of the degree of polymerization of the cellulosic coating. Use of viscose with subsequent regeneration is illustrative of the invention, but other cellulose solutions and solubilized derivatives may also be used as noted above. Fundamental to the present invention is the concept of using cellulose or a cellulose derivative in contact with a nonwoven with control of the extent of penetration of the coating cellulosic solution into the nonwoven to improve separator properties. By increasing the speed in which the coated nonwoven is regenerated after contact between nonwoven and coating material, the amount of cellulose or cellulose derivative penetration into the nonwoven may be limited or controlled to improve the battery separator's electrolyte absorption rate or the electrolyte absorptive capacity. Penetration may also be controlled or limited by increasing the viscosity of the coating liquid, e.g. by lowering the temperature of the coating film. A preferred way of limiting or controlling penetration is to modify the degree of polymerization (DP) of the coating material. A cellulose or cellulose derivative having a DP of at least 500 anhydroglucose units is generally employed. Preferably, the DP will be at least 600, and may advantageously be at least about 700 to allow control of the degree of penetration of the coating material. A combination of one or more of the above parameters may also be adjusted to modify penetration.

It will be appreciated that various forms of dies known in the art may be used. In tubular film manufacture the die has an annular opening. For production of flat film or sheets the die may be a slot. Coextrusion or extrusion coating dies may be employed as well as dies for coating opposing sides of the cellulosic nonwoven e.g. paper substrate.

Optionally, the olefinic oxide polymer may be added to the cellulose, cellulosic solution or cellulose derivative at any point prior to the extrusion or shape forming step as long as the poly(ethylene oxide) becomes sufficiently mixed to produce a homogeneous mixture at extrusion. It should be clearly understood that such addition of olefinic oxide polymer may be made at various points prior to extrusion regardless of the process utilized to create an extrudable cellulose or extrudable cellulose derivative including the aforementioned cuprammonium, cellulose acetate, N-methyl-morpholine-n-oxide, fine chloride, and cellulose carbamate processes as well as the well known viscose process which is presented here as a preferred example of the applicable processes. Coatings of cellulose derivatives may be converted back to cellulose.

Extrusion of viscose onto the paper tube 29 through die 27 into the aquarium 28 produces a partially coagulated and regenerated cellulosic article which is conveyed by transfer means 30 to additional acid regeneration means 31 such as one or more consecutive tubs of acid. The regenerated cellulosic article, by way of example, may be a tube which is then conveyed by transfer means 32 to washing means 33 such as one or more consecutive tubs of water which may also contain additives such as caustic e.g. to adjust pH and facilitate removal of sulphur by-products. The washed article of regenerated cellulose is conveyed by transfer means 34 to drying means 35. Drying means 35 may be humidity controlled hot air dryers where the moisture content of the battery separator is adjusted.

Referring again to the drawings, the dried, moisture adjusted casing is conveyed via transfer means 36 to collection means 37 such as a take-up reel or slitting operation to produce rolls of flat sheet. Typical transfer means 30,32, 34, and 36 may each comprise one or more rollers.

In view of the above, it should be understood that the present invention provides a process for making a battery separator comprising: contacting a nonwoven cellulosic textile substrate with a cellulose or cellulose derivative solution on at least one side of said substrate; converting said solution to a solid cellulose or cellulose derivative having a degree of polymerization of at least 500 to form a coated substrate; washing and drying said coated substrate to provide a battery separator having an absorption rate of at least 6 mm/5 min. of an aqueous 30 wt. % KOH solution and a 30% KOH absorption capacity of at least 200 g/m$^2$.

The following examples including comparative examples are given to illustrate the present invention.

Experimental results of the following examples are based on tests similar to the following test methods unless noted otherwise.

Basis Weight of Battery Separators

Basis weight is a measure of the amount of separator material present including any equilibrium moisture in the separator at the time of measurement. Unless otherwise noted basis weight is reported in units of grams per square meter (g/m$^2$). The test procedure is as follows:

1. A template measuring 1.25"×0.75" is placed on the separator.
2. A sharp blade is used to cut around the template to make a sample measuring 1.25"×0.75" (area=0.9375 in$^2$= 0.0006048 m$^2$=1653 m$^{-2}$).
3. The cut sample is weighed to an accuracy of 0.0001 grams (g).
4. The basis weight is calculated by multiplying the weight (g) in step 3 by 1653 m$^{-2}$.

KOH Absorption Capacity of Battery Separators

Potassium hydroxide (KOH) absorption is a measure (reported in g/m$^2$) of how much electrolyte a separator will hold. This measurement is referred to as Absorption Capacity, Total Absorption, or as KOH Absorption. The test procedure is as follows:

1. A template measuring 1.25"×0.75" is placed on the separator.
2. A sharp blade is used to cut around the template to make a sample measuring 1.25"×0.75" (area=0.9375 in$^2$= 0.0006048 m$^2$=1653 m$^{-2}$).
3. The cut sample is weighed to an accuracy of 0.0001 g.
4. The basis weight (in g/m$^2$) is calculated by multiplying the weight in step 3 by 1653 m$^{-2}$.
5. The cut separator sample is allowed to soak in an aqueous solution of KOH of reported strength for 10 minutes.
6. The fully soaked separator is removed from the electrolyte with tweezers and allowed to drip until excess electrolyte is gone (approximately 10–30 seconds).
7. Each flat surface of the separator is then with tweezers dragged across a glass plate until it is visually apparent that no additional excess electrolyte is being transferred to the glass plate. This removes the excess surface electrolyte from the separator.
8. The saturated separator is then weighed to the nearest 0.0001 g.
9. The electrolyte saturated weight of the separator is calculated by multiplying the weight from step 8 by 1653 m$^{-2}$.
10. The KOH absorption is calculated by subtracting the basis weight of the separator (from step 4) from the saturated weight of the separator (from step 9) and is reported in g/m$^2$.

Absorption Rate of Battery Separators

Absorption rate is a measure of how quickly electrolyte will absorb into a battery separator. The following procedure is used:

1. A template measuring 2"×4" is placed onto a separator.
2. The 2"×4" sample is cut with a razor blade and is marked with an arrowhead shaped notch on one of the long sides ¼" from the bottom.
3. The separator is placed into an electrolytic solution (30 wt. % KOH) up to the mark.
4. The separator is allowed to absorb electrolyte for 5 minutes.
5. The highest wet edge is marked and the distance from the ¼" starting point is measured in mm.
6. The absorption rate is reported as mm of climb in 5 minutes.

The above description and below examples are given to illustrate the invention and methods of making the invention, but these examples should not be take as limiting the scope of the invention to the particular embodiments or parameters demonstrated since modifications of these teachings will be apparent to those skilled in the art.

EXAMPLES 1–6

In examples 1–6, a series of battery separators were made using the viscose process for manufacturing fiber reinforced sausage casings. Examples 1–3 are comparative examples (Not of the Invention); and examples 4–6 are of the invention. Comparative examples 1–3 are representative of the capabilities of prior art fibrous casing type battery separators which have been in use during the past several decades. Battery separators of a cellulose film coated onto a cellulosic nonwoven substrate were made. The penetration of the cellulosic film into the a cellulosic nonwoven substrate was controlled to achieve the benefits of the present invention. Two viscoses which differed in the degree of polymerization were used to coat separate samples of the same nonwoven substrate (a cellulose casing paper available from C. H. Dexter Corp.) on one side. One set of samples (1–3) was made by coating the substrate with viscose having a DP of about 500 at three different levels of loading and another set (4–6) was made at the same loadings but coating with a viscose having a DP of about 700. All of the coated samples were regenerated in the usual manner of the viscose process (described above) except that the samples were not plasticized (no glycerin), a typical requirement for battery separators. The six test samples were evaluated for absorption rate and KOH absorption using a 30% KOH solution. The test conditions and results are described as follows in Table 1:

TABLE 1

| EX-AM-PLE NO. | Viscose DP | Regenerated Cellulose: Non-woven Weight Ratio | % ADDED CELLU-LOSE | 5 MINUTE ABSORPTION (mm of climb) | 30% KOH ABSORPTION (g/m$^2$) |
|---|---|---|---|---|---|
| 1 | 500 | 1.25 | 125 | 3.5 | 250 |
| 2 | 500 | 1.5 | 150 | 4.2 | 325 |
| 3 | 500 | 1.8 | 180 | 4.0 | 320 |
| 4 | 700 | 1.25 | 125 | 16 | 340 |
| 5 | 700 | 1.5 | 150 | 15 | 350 |
| 6 | 700 | 1.8 | 180 | 6.0 | 380 |

Examples 1–3 are representative of prior art cellulosic fibrous casing-type battery separator properties and capabilities with respect to absorptive rate and capacity. The data show that the higher DP viscose which limited penetration of the cellulose into the nonwoven resulted in better absorption rates and total KOH absorption than the comparably coated lower DP viscose which had the typical greater penetration. Absorption rates of at least 6 mm/5 min. were demonstrated for all examples of the invention. Beneficially, examples 4 and 5 demonstrated rates of at least 10 mm/5 min., and advantageously these rates were at least 12 mm/5 min. The fast absorption rates of 6, 15 and 16 mm/min, all permit faster manufacture of batteries. The absorption rate improvement is due to reduced penetration of the viscose into the non-woven. The inventive examples also show increases in electrolyte absorptive capacity. The absorptive capacity test performed with a 30% KOH solution demonstrated that all exemplified separators had an absorptive capacity of at least 200 g/m$^2$. The inventive separators also had a capacity of at least 300 g/m$^2$, and achieved a capacity of at least 330 g/m$^2$. One inventive separator was able to absorb at least 375 g/m$^2$. The KOH absorption capacity improvement is believed due to the separator being a bit thicker than the lower DP samples which gives the separator more space to absorb electrolyte. Also, all of the examples produced separators which are delamination resistant due to strong bonds between the cellulose film and cellulose nonwoven substrate. No noncellulosic glue or adhesive was necessary in this process.

The cellulosic nonwoven alone was also tested and was determined to have an absorptive rate which is much higher than any of the coated examples in Table 1, and also to have an absorptive capacity much lower than the coated nonwovens. The higher rate is believed due to a higher capillary action of the uncoated nonwoven cellulose fiber substrate while the relatively lower capacity is attributable to the lower amount of cellulose. A major problem with the use of nonwoven cellulose substrate alone, such as paper, is the high rate of degradation of the substrate in contact with the electrolyte which leads to an unacceptably high rate of premature battery failure. Battery separators of the present invention resist electrolyte degradation and are suitable for production of commercial batteries by modem high speed manufacturing processes. Simultaneous with the filing of this application, the present inventors, T. Danko et al have filed a related application, U.S. Ser. No. 08/585,555 entitled, "Long Life Battery Separator", which application is hereby incorporated by reference in its entirety. This related application addresses producing a long life, degradation resistant separator having a noncellulosic nonwoven substrate or a nonwoven blend of a noncellulosic with cellulosic fibers.

The above examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A delamination resistant, battery separator comprising: a nonwoven cellulosic substrate coated on at least one surface with a film of cellulose, regenerated cellulose, deacetylated cellulose acetate, or viscose having a degree of polymerization of at least about 600 wherein said separator has an absorption rate of at least 6 mm/5 min. of an aqueous 30 wt. % KOH solution, and a 30 wt. % KOH solution absorption capacity of at least 330 g/m$^2$.

2. A battery separator, as defined in claim 1, wherein said separator has an absorption rate of at least 10 mm/5 min.

3. A battery separator, as defined in claim 1, wherein said separator has an absorption rate of at least 12 mm/5 min.

4. A battery separator, as defined in claim 1, wherein said separator has a 30% KOH solution absorption of at least 375 g/m$^2$.

5. A battery separator, as defined in claim 1, wherein said cellulose coating has a degree of polymerization of at least about 700.

6. A battery separator, as defined in claim 1, wherein said cellulose coating comprises regenerated cellulose.

7. A battery separator, as defined in claim 1, wherein said cellulose coating is deacetylated cellulose acetate.

8. A battery separator, as defined in claim 1, wherein said cellulose coating is derived from cellulose material which comprises at least 90% α-cellulose.

9. A battery separator, as defined in claim 1, wherein said cellulose coating is derived from cellulose material which comprises at least 95% α-cellulose.

10. A battery separator, as defined in claim 1, wherein said cellulose coating is derived from cellulose material which comprises at least 98% α-cellulose.

11. A battery separator, as defined in claim 1, wherein said nonwoven substrate comprises cellulose paper.

12. A battery separator, as defined in claim 1, wherein said nonwoven substrate comprises hemp paper.

13. A battery separator, as defined in claim 1, wherein said nonwoven substrate comprises natural cellulose fibers, synthetic cellulose fibers, or blends thereof.

14. A battery separator, as defined in claim 1, wherein said nonwoven substrate consists essentially of at least 95% natural cellulose fibers, synthetic cellulose fibers, or blends thereof held together by a binding means.

15. A battery separator, as defined in claim 14, wherein said binding means comprises 5% or less of regenerated cellulose, an alkyl ketene dimer, a solvated cellulose, or blends thereof.

16. A process for making a battery separator comprising:

contacting a nonwoven cellulosic textile substrate with a solution of cellulose, viscose, cellulose carbamate, cellulose xanthate, or cellulose acetate on at least one side of said substrate; converting said solution to a solid cellulosic film having a degree of polymerization of at least 600 to form a coated substrate; washing and drying said coated substrate to provide a battery separator having an absorption rate of at least 6 mm/5 min. of an aqueous 30 wt. % KOH solution and a 30% KOH absorption capacity of at least 330 g/m².

17. A process, as defined in claim 16, wherein said absorption rate is at least 12 mm/5 min.

18. A process, as defined in claim 16, in which prior to said contact step, said substrate is formed into a tube.

19. A process, as defined in claim 16, wherein said cellulose solution is a solution of cellulose in N-methyl-morpholine-n-oxide.

20. A process for making a battery separator having a high absorption rate comprising:

contacting a nonwoven cellulosic substrate web with a solution of cellulose having at least 95% α-cellulose in a solvent of N-methyl-morpholine-n-oxide while forming said substrate into a tube;

converting said solution to a solid cellulose having a degree of polymerization of at least 600 by removing said solvent to form a cellulose coated tubular substrate;

washing and drying said tubular coated substrate to provide a glycerine-free battery separator having a coated substrate thickness of 10 mils or less; wherein penetration of said cellulose coating into said nonwoven substrate is controlled to provide a delamination resistant battery separator having an absorption rate of at least 6 mm/5 min of an aqueous 30 wt. % KOH solution and a 30% KOH absorption capacity of at least 330 g/m².

21. A process, as defined in claim 20, wherein said cellulose coating is applied at a level of from 100 to 300% bone dry gauge of said nonwoven substrate.

22. A process, as defined in claim 21, wherein said coating application level is from 100 to 150% bone dry gauge of said nonwoven substrate.

* * * * *